A. W. HARRIS.
MACHINE FOR MAKING PAPER BOXES.
APPLICATION FILED NOV. 27, 1917.

1,347,853.

Patented July 27, 1920.
9 SHEETS—SHEET 1.

WITNESSES

INVENTOR
A. W. Harris
BY
ATTORNEY

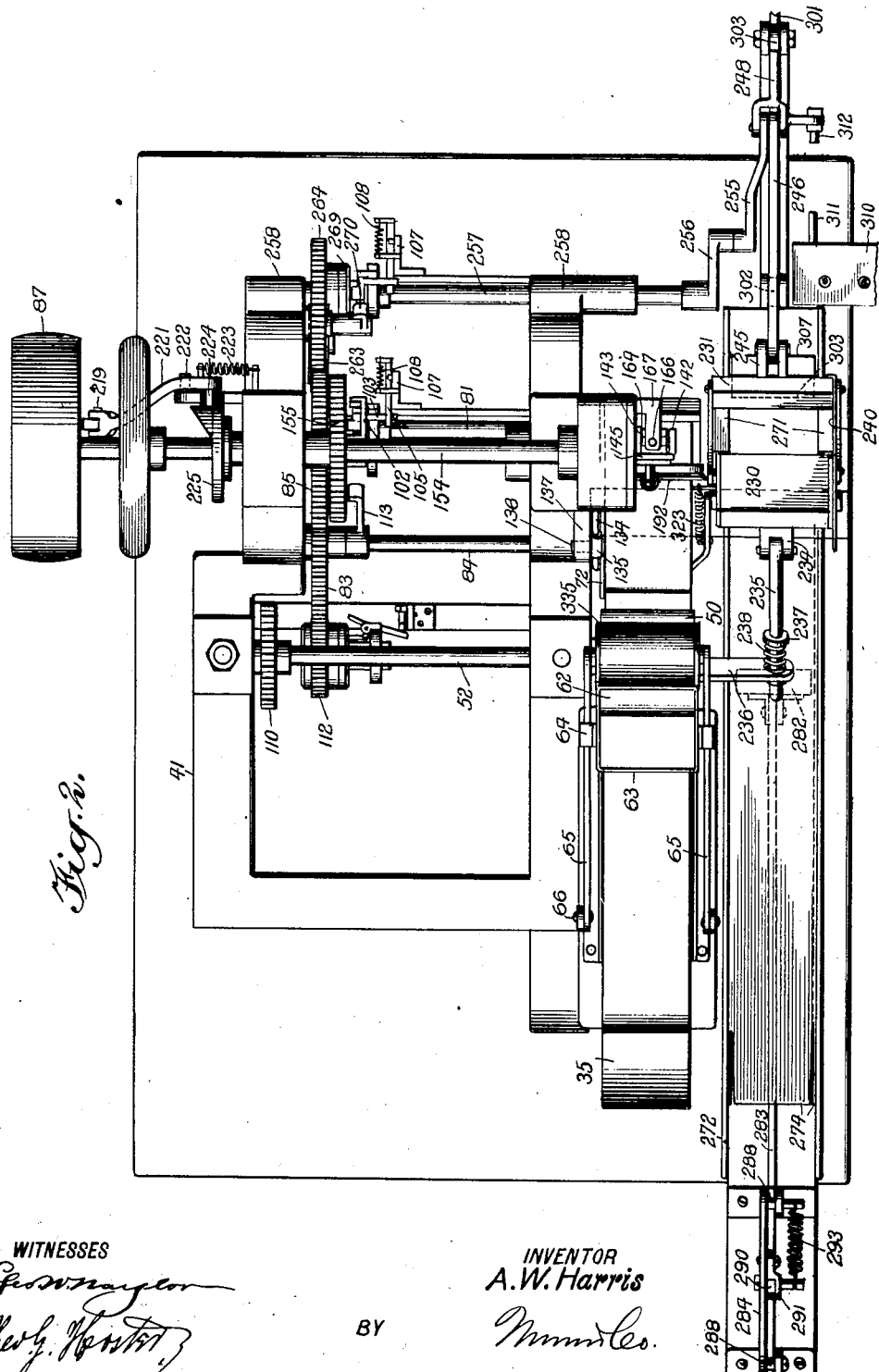

A. W. HARRIS.
MACHINE FOR MAKING PAPER BOXES.
APPLICATION FILED NOV. 27, 1917.
1,347,853.
Patented July 27, 1920.
9 SHEETS—SHEET 3.
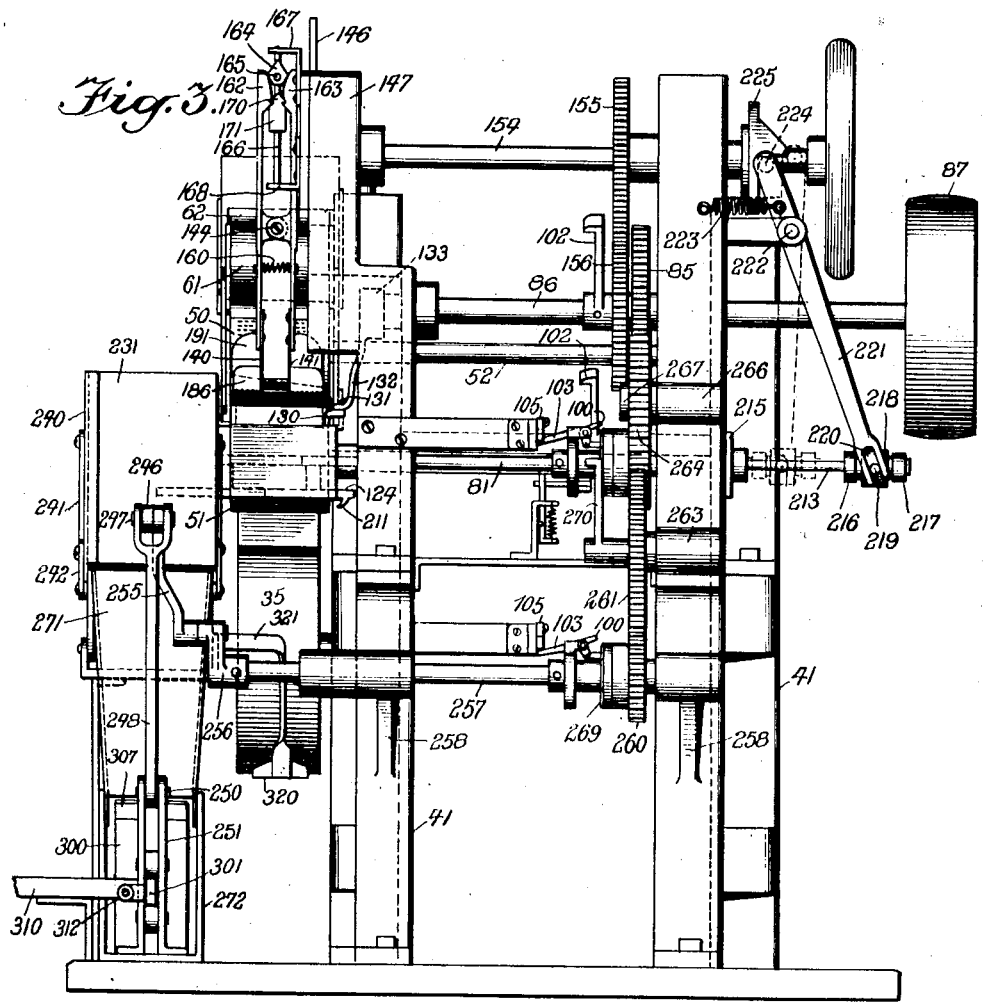
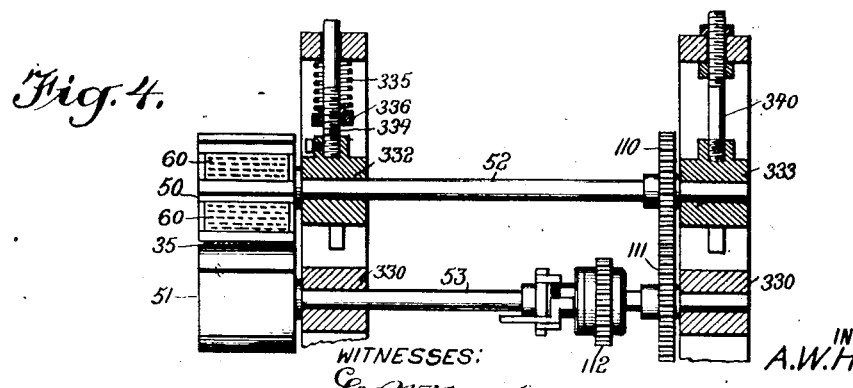
WITNESSES:
INVENTOR
A.W. Harris
BY
ATTORNEYS

A. W. HARRIS.
MACHINE FOR MAKING PAPER BOXES.
APPLICATION FILED NOV. 27, 1917.

1,347,853. Patented July 27, 1920.
9 SHEETS—SHEET 4.

WITNESSES

INVENTOR
A. W. Harris
BY
ATTORNEYS

A. W. HARRIS.
MACHINE FOR MAKING PAPER BOXES.
APPLICATION FILED NOV. 27, 1917.
1,347,853.
Patented July 27, 1920.
9 SHEETS—SHEET 5.
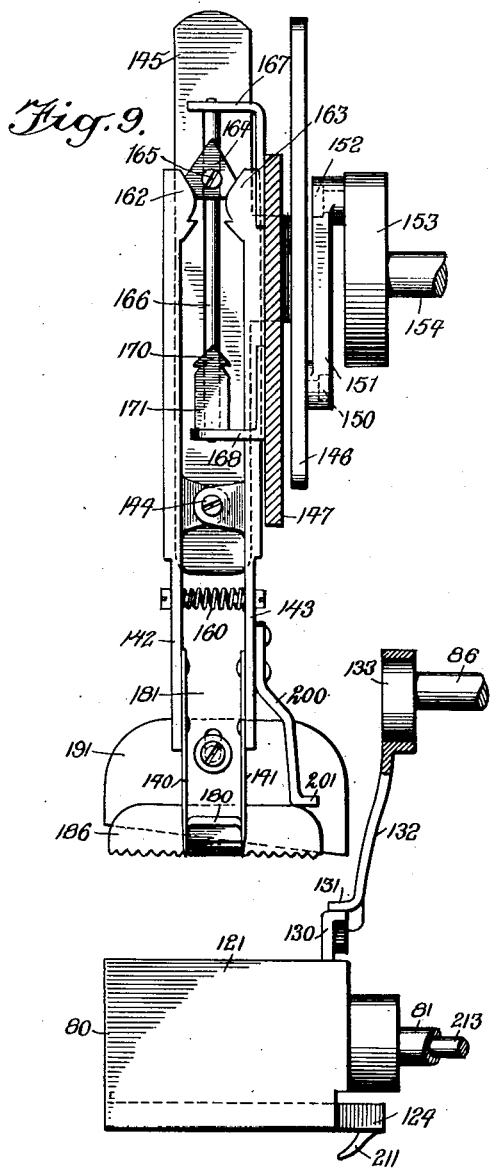
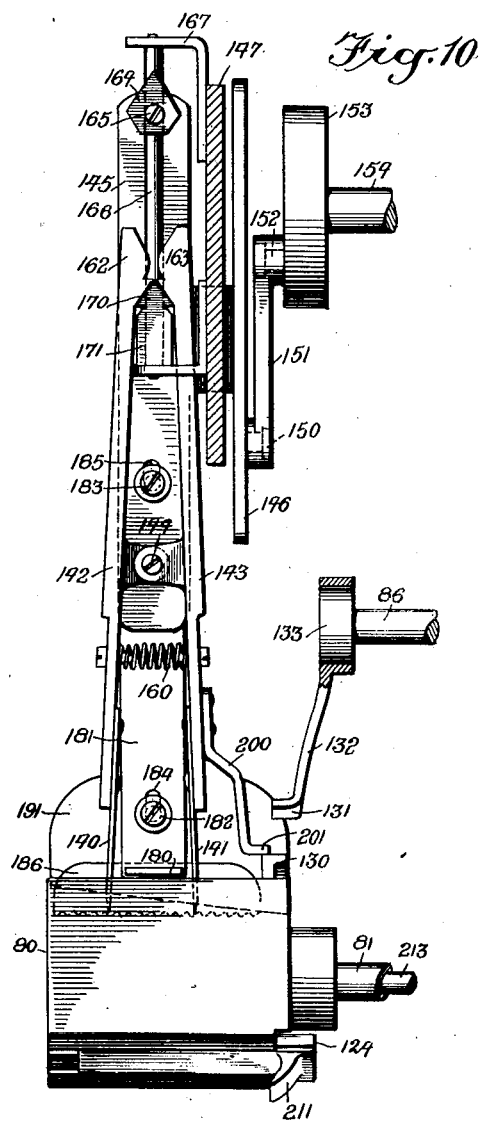
WITNESSES
INVENTOR
A. W. Harris
BY
ATTORNEYS

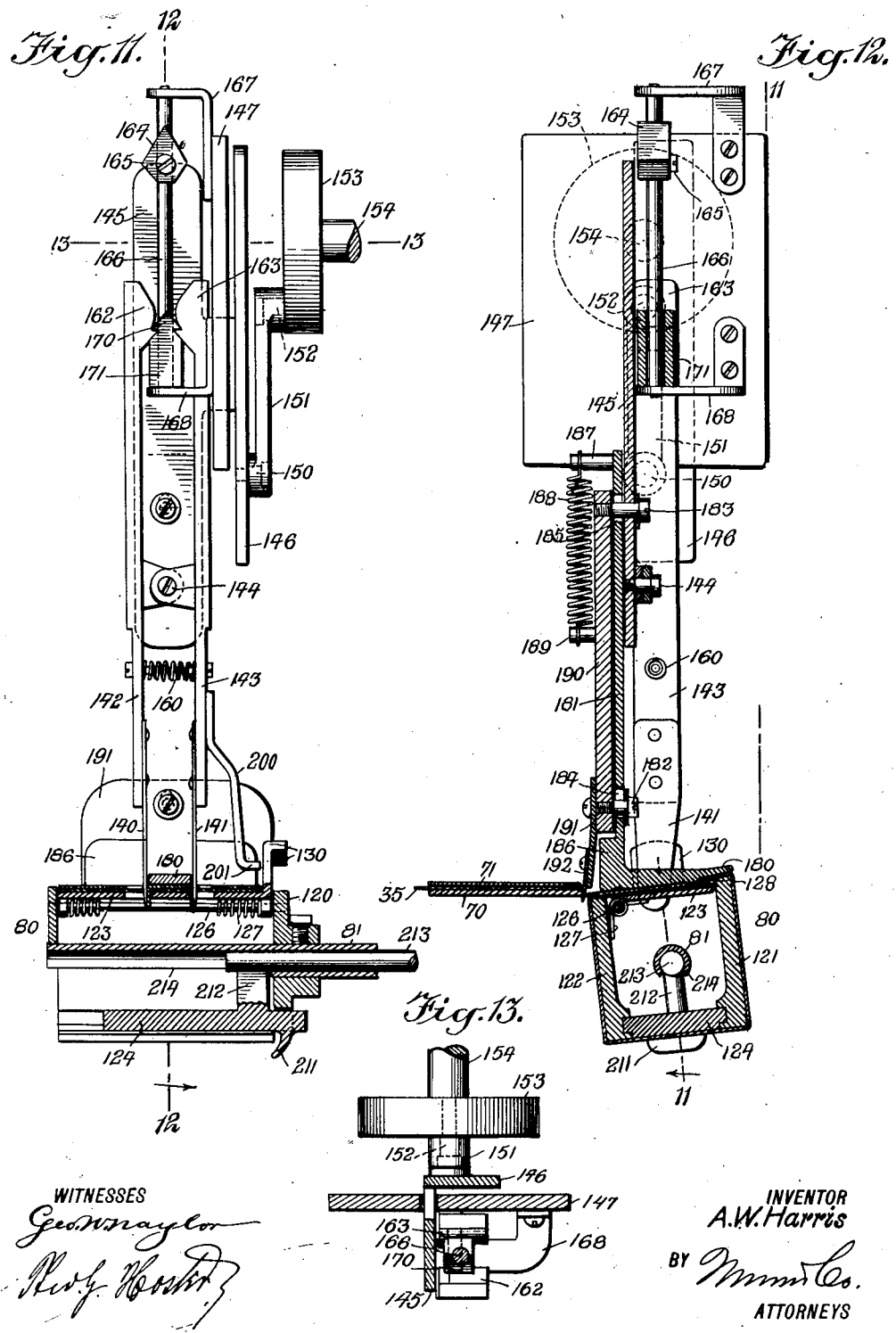

A. W. HARRIS.
MACHINE FOR MAKING PAPER BOXES.
APPLICATION FILED NOV. 27, 1917.
1,347,853. Patented July 27, 1920.
9 SHEETS—SHEET 7.
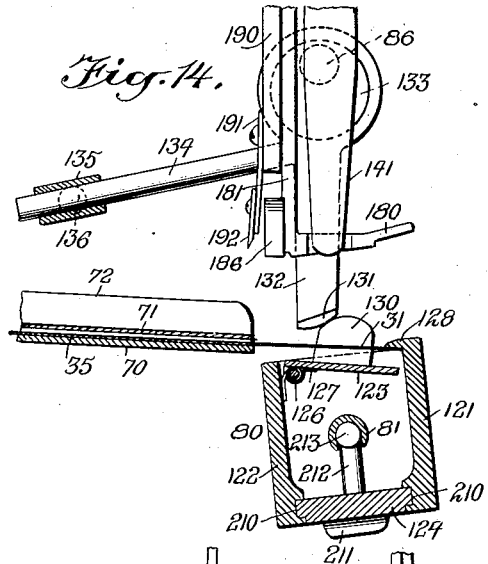
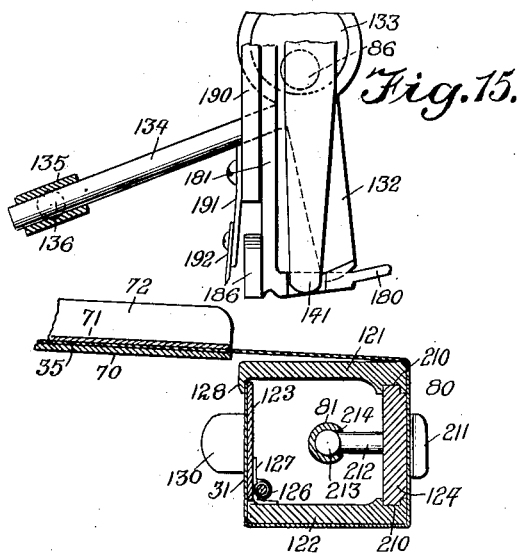
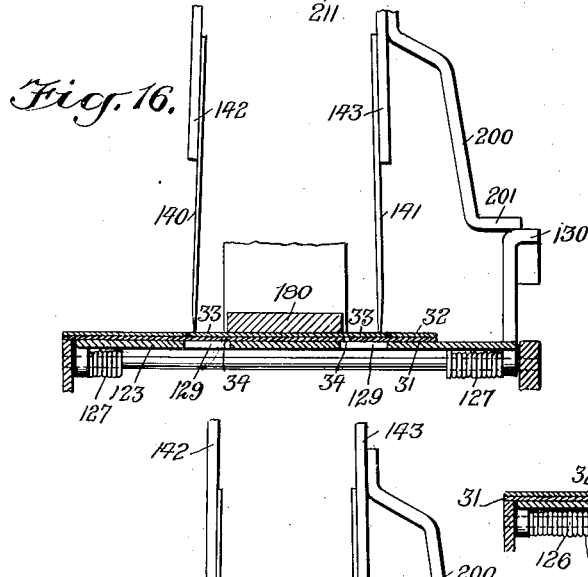
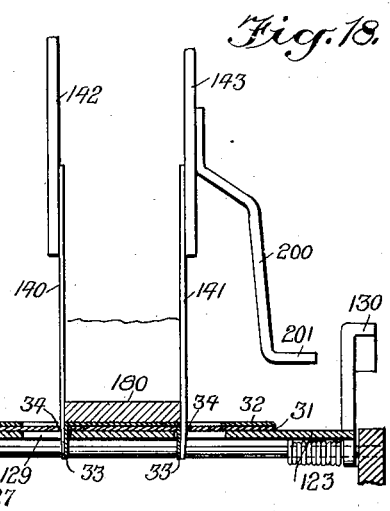
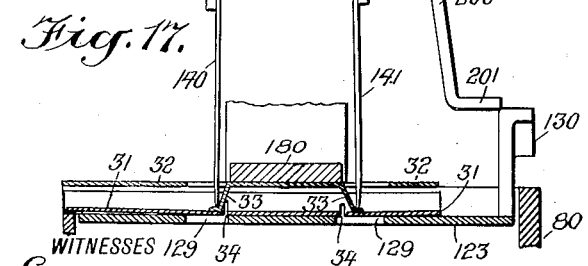
INVENTOR
A. W. Harris
BY
ATTORNEYS

A. W. HARRIS.
MACHINE FOR MAKING PAPER BOXES.
APPLICATION FILED NOV. 27, 1917.

1,347,853.  
Patented July 27, 1920.  
9 SHEETS—SHEET 8.

WITNESSES

INVENTOR  
A. W. Harris  
BY  
ATTORNEYS

A. W. HARRIS.
MACHINE FOR MAKING PAPER BOXES.
APPLICATION FILED NOV. 27, 1917.
1,347,853.
Patented July 27, 1920.
9 SHEETS—SHEET 9.
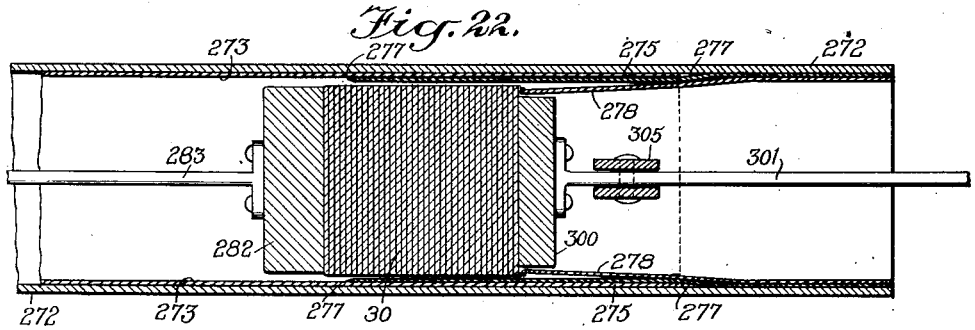
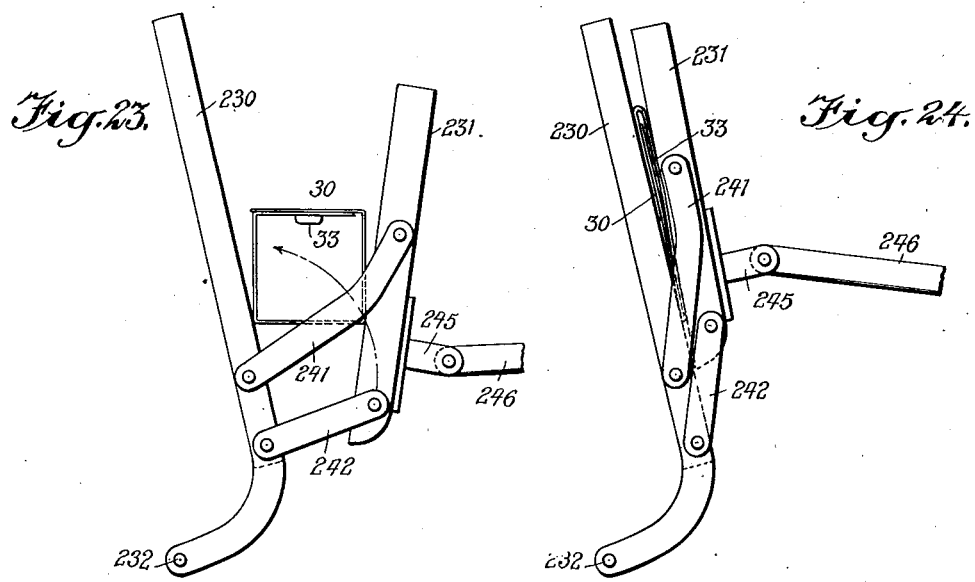
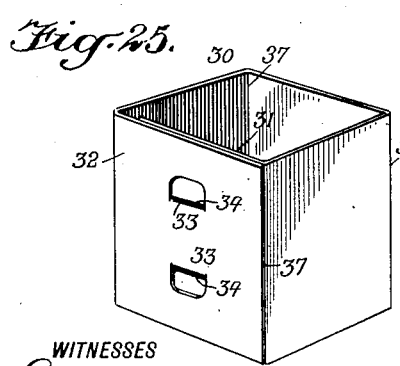
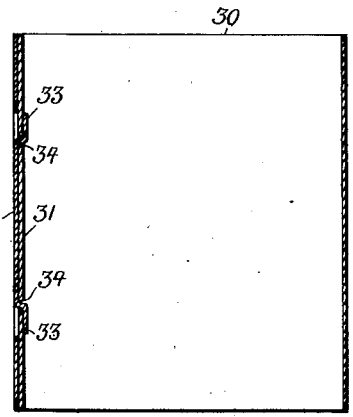
INVENTOR
A. W. Harris
BY
ATTORNEYS

UNITED STATES PATENT OFFICE.

ARTHUR W. HARRIS, OF SLEEPY EYE, MINNESOTA.

MACHINE FOR MAKING PAPER BOXES.

1,347,853.　　　　Specification of Letters Patent.　　Patented July 27, 1920.

Application filed November 27, 1917. Serial No. 204,165.

*To all whom it may concern:*

Be it known that I, ARTHUR W. HARRIS, a citizen of the United States, and a resident of Sleepy Eye, in the county of Brown and State of Minnesota, have invented a new and Improved Machine for Making Paper Boxes, of which the following is a full, clear, and exact description.

The invention relates to the manufacture of paper boxes in general and more particularly to making box bodies open at the top and bottom and such as are used by florists, market gardeners and other persons for growing young plants therein to be subsequently transplanted in lieu of the flower pots heretofore used for this purpose, such boxes being known in the trade as dirt bands.

The object of the invention is to provide a new and improved machine for making paper boxes from an endless strip or web of paper in large quantities in a comparatively short time, the machine being entirely automatic in operation and arranged to cut a proper length of paper for a single box from the roll of paper, to crease the paper transversely and to provide the same with interlocking members to shape the strip of paper into box form and to interlock the locking members with a view to produce a polygonal box or receptacle open at the top and bottom.

In order to produce the desired result, use is made of a feeding, scoring and lock forming means arranged for feeding a strip of paper forward, scoring it transversely and providing it with locking members, a forming means receiving the strip of paper from the said feeding, scoring and lock forming means and forming the strip into polygonal shape along the creases as the corners, and interlocking means coacting with the said forming means and engaging the locking members with each other. Use is also made of an ejecting means coacting with the said forming means for removing the formed box from the forming means. Use is further made of printing means for providing the strip of paper with a desired legend. Use is further made of a flattening device which receives the box from the forming device and presses the box into flat shape with two adjacent sides alined. Still further use is made of a carton filling device coacting with the said flattening device and receiving the flattened box therefrom, the said filling device filling the flattened boxes successively into a carton or other receiving receptacle.

A practical embodiment of the invention is represented in the accompanying drawings forming a part of this specification, in which similar characters of reference indicate corresponding parts in all the views.

Fig. 2 is a plan view of the same;

Fig. 3 is a right hand end view of the same;

Fig. 4 is a cross section of the feeding, scoring and lock forming device, the section being on the line 4—4 of Fig. 1;

Fig. 9 is a right-hand end view of the forming and interlocking device with parts shown in section;

Fig. 10 is a similar view of the same with the parts in different position;

Fig. 11 is a cross section of the same on the line 11—11 of Fig. 12 and showing the parts in another position;

Fig. 12 is a sectional side elevation of the same on the line 12—12 of Fig. 11;

Fig. 13 is a sectional plan view of the same on the line 13—13 of Fig. 11;

Fig. 14 is a sectional side elevation of the forming device with the clamping plate in open position for receiving the forward end of the strip of paper;

Fig. 15 is a similar view of the same with the parts in a different position;

Fig. 16 is an enlarged cross section of a portion of the interlocking device with the parts in position at the beginning of the interlocking operation;

Fig. 17 is a similar view of the same with the parts in position for pushing the locking tongues of one overlapping portion of the paper through the slits in the other overlapped portion of the paper;

Fig. 18 is a similar view of the same with the parts in position after the tongues have been pushed through the slits;

Fig. 22 is a sectional plan view of the carton filling device;

Fig. 23 is a side elevation of the flattening device for flattening the formed boxes, the parts being shown in open position;

Fig. 24 is a similar view of the same with the parts in closed position;

Fig. 25 is a perspective view of the finished box; and

Fig. 26 is an enlarged sectional side elevation of the same.

Figure 1:
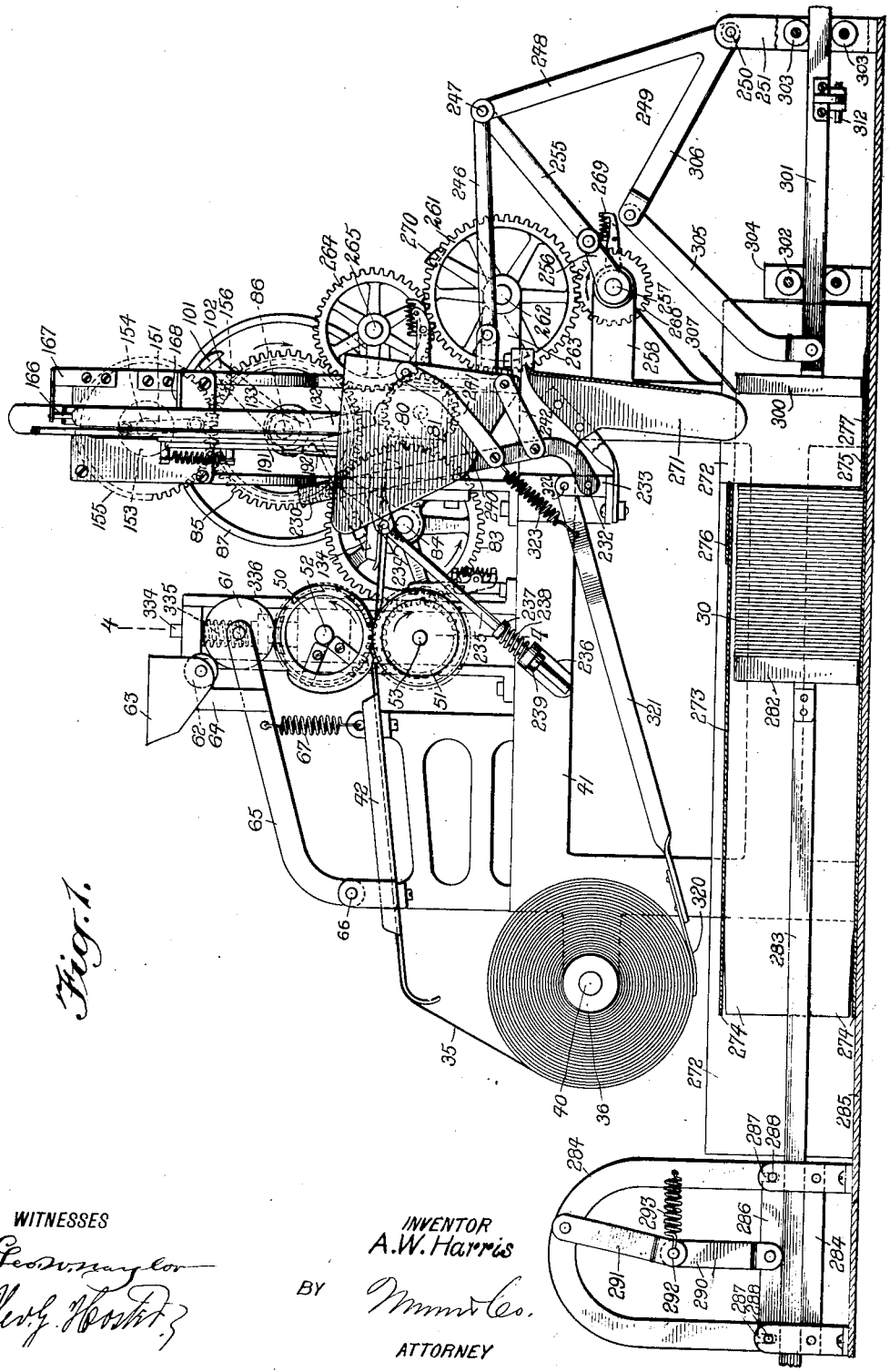
Figure 1 is a side elevation of the machine with the device for filling the flattened boxes into a carton shown in section.
Figure 5:
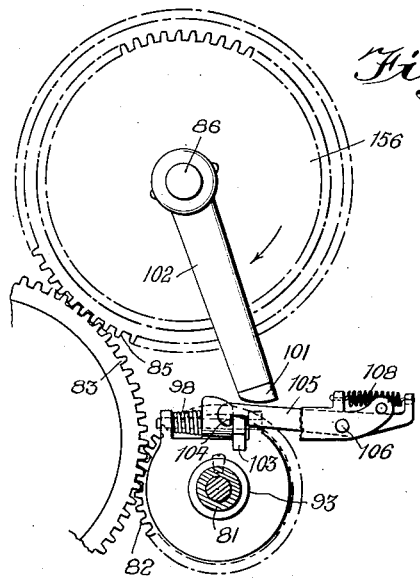
Fig. 5 is a side elevation of one of the clutches.
Figure 6:
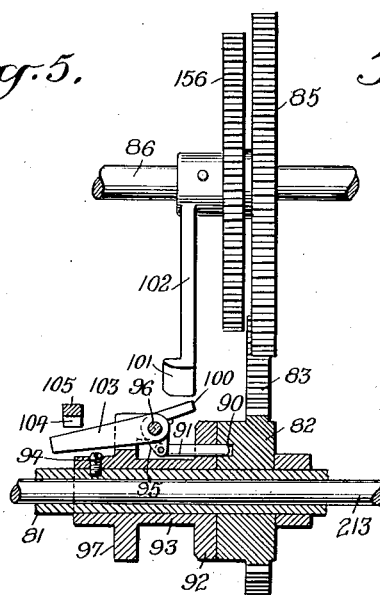
Fig. 6 is a cross section of the same.
Figure 7:
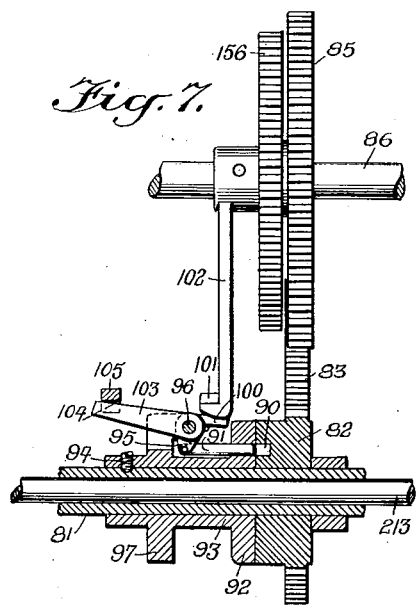
Fig. 7 is a similar view of the same with the parts in a different position.
Figure 8:
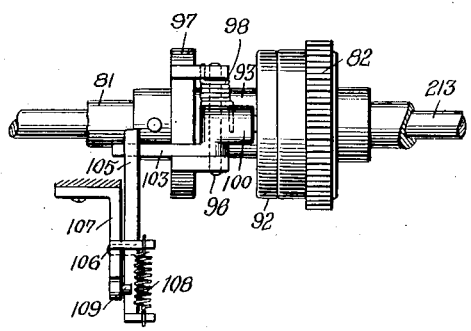
Fig. 8 is a plan view of the same.

The product of the machine, as shown in Figs. 25 and 26 will hereinafter be referred to as a box 30 which is of polygonal shape, preferably four-sided, with the ends 31 and 32 of the paper overlapping to form one side of the box, the overlapped portions 31 and 32 being fastened together by one or more tongues 33 integral on the overlapping portion 32 and engaging a corresponding slit or slits 34 in the other overlapped portion 31, the latter being slightly less in length than the overlapping portion 32. The paper boxes are formed successively from a strip of paper 35 in the form of a roll and having a core 36 mounted to turn on a stud 40 attached to the main frame 41 of the machine. The paper 35 after unwinding from its roll passes over a guideway 42 mounted on the main frame 41 and guiding the paper to and between intermittently revolving coacting rollers 50 and 51 forming part of the feeding, scoring, lock forming and printing means which feeds the paper forward from the left to the right, provides the paper with transverse scores 37, produces tongues 33 and slits 34 and also prints a legend on one, two or three of the sides of the box 30, that is, except the ones having the interlocking tongues 33 and slits 34.

Figure 19:
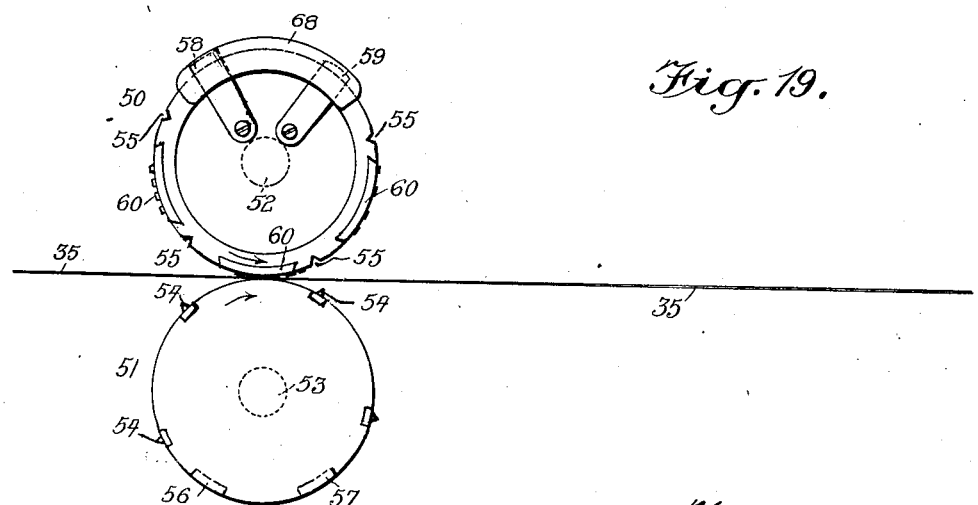
Fig. 19 is a side elevation of the feeding, scoring, lock forming, and printing devices.

The rollers 50 and 51 rotate in unison and are intermittently revolved, that is, make one revolution at a time, and during which revolution they feed the paper forward a length for forming a single box 30. The roller 50 is disposed above the roller 51, and the said rollers 50 and 51 are secured on shafts 52 and 53. The peripheral face of the bottom roller 51 (see Figs. 19, 20 and 21) is provided with transversely extending V-shaped ridges 54 coacting with correspondingly shaped grooves 55 formed in the peripheral face of the top roller 50 to form scores 37 in the paper 35. For forming a four-sided box four ridges 54 and corresponding grooves 55 are provided. The peripheral face of the roller 51 is divided into approximately five equal spaces, and the four ridges 54 are spaced apart approximately equal distances at three of the peripheral portions, while the other two portions are provided with recesses 56 and 57 for the reception of the coacting knives 58 and 59 arranged on the peripheral face of the upper roller 50. The knives 58 are approximately U-shape and arranged in transverse alinement and serve to form the tongues 33 integrally in the paper 35, while the knives 59 are plain straight knives and cut the slits 34 in the paper 35 and in longitudinal alinement with the bases of the tongues 33, as will be readily understood by reference to Fig. 20.

The peripheral face of the top roller 50 is provided intermediate the creasing grooves 55 with removable printing type 60 for printing the desired legends on the paper intermediate the corresponding scores 37. The type 60 is inked by an inking roller 61 in contact with a fountain roller 62 mounted in a fountain 63 supported on suitable brackets 64 attached to arms 65 in which the inking roller 61 is journaled. The arms 65 are pivoted at 66 on the main frame 41 and are pressed on by a spring 67 to hold the inking roller 61 in engagement with the printing type 60. The sides of the roller 50 are provided with raised segments 68 encompassing the knives 58 and 59 so that the inking roller 61 is held out of contact with the roller 50 during the time the knives 58 and 59 pass under the inking roller 61 thus preventing injury to the inking roller by the knives 58 and 59.

The paper fed forward by the rollers 50 and 51 passes over a supporting guide 70 and under a retaining guide 71, both guides being attached to the main frame 41. The guide 70 is provided with side flanges 72 to hold the paper against transverse displacement. The forward end of the supporting guide 70 (see Fig. 12) is adjacent the top of a former 80 made four-sided for forming a square box, but this former may be of other polygonal shapes for forming boxes of corresponding polygonal shapes. The former 80 is mounted on a hollow shaft 81 journaled in suitable bearings arranged on the main frame 41, and on the said hollow shaft 81 is mounted to rotate loosely a pinion 82 in mesh with a gear wheel 83 secured on a transverse shaft 84 journaled in suitable bearings arranged on the main frame 41. The gear wheel 83 is in mesh with a gear wheel 85 secured on the main driving shaft 86 adapted to be rotated by hand or driven from other machinery by providing the shaft 86 with a pulley 87 connected by belt with other machinery. Thus when the machine is running a continuous rotary motion is given to the shaft 86 which by the gear wheel 85 rotates the gear wheel 83 which latter in turn rotates the pinion 82 loose on the former shaft 81.

In order to periodically rotate the former shaft 81 from the pinion 82 use is made of a clutch mechanism arranged as follows, special reference being had to Figs. 5, 6, 7 and 8. One face of the pinion 82 is provided with a recess 90 adapted to be engaged by a locking pin or bolt 91 mounted to slide in a flange 92 on a collar 93 secured by a set screw 94 to the hollow shaft 81. The locking pin 91 is pivotally connected with an arm 95 mounted to rotate loosely on a shaft 96 mounted on a flange 97 forming part of the collar 93. The arm 95 is pressed on by a spring 98 coiled on the shaft 96 and attached with one end to the flange 97. The arm 95 is provided with an angular extension 100 adapted to be periodically engaged by a cam 101 formed on the free end of a cam arm 102 secured to the main driving shaft 86. Normally the pin 91 is in engagement with the recess 90 of the pinion 82 to connect the collar 93 with the pinion 82 with a view to transmit the rotary motion of the pinion 82 to the hollow shaft 81 and consequently to the former 80. During a part of the revolution of the shaft 86, the cam 101 moves in contact with the angular arm 100 and imparts a swinging motion to the same and consequently to the arm 95 whereby the pin 91 is withdrawn from engagement with the recess 90 (see Fig. 7) thus disconnecting the pinion 82 from the collar 93. During the time the pin 91 is in retracted position the shaft 81 remains at a standstill.

In order to positively hold the shaft 81 against accidental rotation during the period of rest, the following arrangement is made: The arm 95 is provided with an angular arm 103 adapted to engage a notch 104 formed in the under side of a lever 105 fulcrumed at 106 on a bracket 107 attached to the main frame 41. A spring 108 is connected at one end with the outer end of the lever 105 and is attached at its other end to the bracket 107 to normally hold the lever in position for engagement by the arm 103 whenever the arm 100 is swung downward by the action of the cam 101. A pin 109 on the bracket 107 engages the top of the lever 105 to limit the swinging movement imparted to the lever 105 by the spring 108. It will be noticed that as soon as the cam 101 imparts a swinging movement to the arm 100 and the pin 91 is retracted then the arm 103 engages the notch 104 thus preventing the collar 93 from further rotation, which may be induced by the frictional contact of the flange 92 with the face of the pinion 82 (see Figs. 6 and 7). As soon as the pin 91 is withdrawn the recess 90 moves out of register with the pin 91, and the pinion 82 now makes a complete revolution while the collar 93 and consequently the shaft 81 are held against rotation. When the pinion 82 has completed its revolution then the recess 90 again moves in register with the pin 91 and the latter is now pushed into engagement with the recess 90 by the action of the spring 98 on the arm 95. It is understood that the arms 95 and 100 form a bell crank lever pressed on by the spring 98, and the recess 90 forms a keeper for engagement by the bolt or pin 91 to rotate the shaft 81 once during a half revolution of the main driving shaft 86, and during the remaining half revolution of the main driving shaft 86 the former shaft 81 remains at a standstill. The gear wheels 83 and 85 are alike in diameter while the pinion 82 is about one-half the diameter of the gear wheel 83 or 85 to produce the above described result, that is, to cause the former shaft 81 to make one revolution for one-half revolution of the main driving shaft 86 and to be at a standstill during the remaining half revolution of the shaft 86.

The rollers 50 and 51 are rotated in unison with and slightly ahead of the intermittent rotary motion given to the former 80. For this purpose the shafts 52 and 53 are provided with gear wheels 110, 111 in mesh with each other, as plainly shown in Fig. 4. On the shaft 53 is mounted to rotate loosely a pinion 112 in mesh with the gear wheel 83 above referred to, and this pinion 112 is connected by a clutch mechanism with the shaft 53, and this clutch mechanism is like the one above described and illustrated in Figs. 5, 6, 7 and 8, so that further detail description of the same is not deemed necessary, it being sufficient to state, however, that its cam arm 113, which corresponds to the cam arm 102, is secured on the shaft 84 of the gear wheel 83. This cam arm 113 is set in advance relative to the cam arm 102 so that the shafts 53, 52 and their rollers 50, 51 come to a standstill ahead of the hollow shaft 81 carrying the former 80.

The former 80 is constructed in detail as follows, special reference being had to Figs. 11, 12, 14 and 15: The former 80 is provided at its rear end with a head 120 secured to the shaft 81, and from the head extend the two opposite sides 121, 122 between which extend the clamping side 123 and the ejecting side 124. The clamping side 123 is pivoted at 126 and is pressed outward by a spring 127, and the free end of this clamping side 123 coacts in conjunction with a lip 128 formed on the side 121 to clamp the forward end of the paper 35 between the lip 128 and the free end of the clamping side 123, as plainly indicated in Fig. 12. The clamping side 123 is provided at its rear edge with an upwardly extending cam 130 adapted to be engaged by a cam 131 attached to or forming part of an eccentric rod 132 of an eccentric 133 secured on the forward end of the main shaft 86. The eccentric rod 132 is provided with an angular arm 134 mounted to slide in a bearing 135 provided with a transverse pivot 136 mounted to turn in a bearing 137 attached to the main frame 41. By the arrangement described a rocking movement is given to the eccentric rod 132 to impart an inward swinging movement to the clamping side 123 for the forward end of the paper 35 to pass under the lip 128 and abut against the inner face of the side 121, as plainly shown in Fig. 14. The former 80 begins to rotate immediately after the forward end of the paper has engaged the lip 128 whereby the cam 130 moves out of engagement with the cam 131 and the spring 127 now imparts an outward swinging movement to the clamping side 123 for the latter to clamp the free end of the paper in place against the lip 128. The further rotation of the former 80 is now in unison with the feed rollers 50 and 51 so that the paper is wound around the former 80 with the creases 37 at the corners of the former 80, as will be readily understood by reference to Fig. 15. When the former 80 completes its revolution then the last portion of the paper 35 overlies the first portion thereof at the clamping side 123, it being understood that the first portion 31 of the paper having the slits 34 is overlapped by the last portion having the tongues 33 so that the latter register with the slits 34 at the clamping side 123 (see Figs. 12 and 16).

In order to bend the tongues 33 from their horizontal position into vertical position and to push the same through the slits 34 use is made of the following device, preferably called an interlocking or tucking device: Two upright tucking arms 140, 141 are secured to the lower ends of two levers 142 and 143 pivoted on a stud 144 attached to the front member 145 of a crosshead 146 mounted to slide up and down in a guide head 147 attached to or forming part of the main frame 41. The crosshead 146 is provided with a pivot 150 engaged by a pitman 151 (see Figs. 9 and 10) connected with a wrist pin 152 on a crank disk 153 secured to a crank shaft 154 journaled in suitable bearings arranged on the main frame. On the shaft 154 is secured a gear wheel 155 in mesh with a gear wheel 156 secured on the main shaft 86 so that when the latter is rotated a rotary motion is transmitted by the gear wheels 156 and 155 to the crank shaft 154 which by the crank 153 and the pitman 151 imparts an up and down sliding movement to the crosshead 146 and consequently to the levers 142, 143 carrying the tucking arms 140 and 141. The gear wheels 155 and 156 are of like diameter so that the shafts 86 and 154 rotate in unison. The lower ends of the tucking arms 140 and 141 are adapted to pass downward through slots 129 formed in the clamping side 123. The levers 142 and 143 are pressed apart below the pivot 144 by a spring 160, and the upper ends of the said levers are provided with cams or retaining heads 162, 163 adapted to engage a fixed cam 164 for spreading the upper ends of the levers 142 and 143 with a view to move the tucking arms 140 and 141 toward each other. The cam 164 is attached by a set screw 165 to a vertically disposed guide rod 166 attached to brackets 167 and 168 on the face of the guide head 147. The heads 162 and 163 are also adapted to engage an arrow or spear-shaped head 170 formed on the upper end of a slide 171 mounted to slide up and down on the guide rod 166. When the crosshead 146 is in uppermost position, as shown in Fig. 9, then the heads 162 and 163 engage the cam 164 to hold the levers 142, 143 in a nearly parallel position and likewise the tucking arms 140, 141. The slide 171 with the arrow head 170 now rests on the lower bracket 168 (see Fig. 9), and now when the crosshead 146 slides downward the heads 162, 163 move out of engagement with the fixed cam 164 whereby the spring 160 spreads the lower ends of the levers 142 and 143 apart thus moving the heads 162 and 163 toward each other, as plainly indicated in Fig. 10. The heads 162 and 163 during the further downward movement of the crosshead 146 engage the arrow head 170 of the slide 171, and are thus spread apart and cause the tucking arms 140, 141 to move toward each other, and when the crosshead 146 reaches its lowermost position the heads 162, 163 snap in under the arrow head 170 (see Fig. 11) thus holding the levers 142 and 143 and their tucking arms 140, 141 in a practically parallel position. During the next upward movement of the crosshead 146, the slide 171 is carried along by the levers 142, 143 moving upward with the crosshead 146, and when the latter moves into an uppermost position the heads 162, 163 engage the fixed cam 164 spreading the heads 162, 163 sufficiently far apart to disengage the arrow head 170 and allow the slide 171 to drop downward on the guide rod 166 until it rests again on the lower bracket 168, as previously described and shown in Fig. 9.

A presser foot 180 extends between the tucking arms 140 and 141 and is adapted to bear on top of the end portion 32 of the paper at the time the latter overlies the first portion 31 (see Fig. 12). The presser foot 180 is provided with an upwardly extending bar 181 mounted to slide up and down on studs 182, 183 held on the front member 145 of the crosshead 146, the studs 182, 183 extending through slots 184, 185, formed in the presser bar 181 to allow upward and downward sliding movement of the presser foot 180. The left hand end of the presser foot 180 is provided with a crossbar 186 extending across the top portion 32 of the paper to securely hold the latter in place during the tucking operation, as hereinafter more fully explained. The upper end of the presser bar 181 is provided with a lug 187 to which is attached the upper end of a spring 188 connected at its lower end with a lug 189 on a knife bar 190 attached by the studs 183 to the front member 145 of the crosshead 146 to reciprocate with the latter. On the lower end of the knife bar 190 is secured a knife holder 191 carrying a knife blade 192 adapted to operate in conjunction with the forward edge of the guide 70 to cut off the paper fed forward and wound around the former 80 at the time the presser foot 180 is in engagement with the upper portion 32 and the forward feeding of the paper 35 by the rollers 50, 51 has ceased, as will be readily understood by reference to Fig. 1. It is understood that by the arrangement described the presser foot 180 as well as the knife blade 192 are moved up and down by the reciprocating crosshead 146, and the presser foot 180 in addition has a yielding motion to firmly engage the portion 32 of the paper to hold the latter in contact with the portion 31 while cutting the paper, and during a part of the tucking or interlocking operation, as hereinafter more fully explained. The cutting edge of the knife blade 192 is inclined relative to the forward edge of the guide 70 to cut the paper with a shearing cut. The forward edges of the flanges 72 of the guide 70 are rounded off to form a guide for the edge of the knife blade 192 to prevent the latter from sticking to the guide 70.

The lever 143 is provided with a downwardly extending arm 200 provided at its lower end with an angular lug 201 adapted to engage the cam 130 of the clamping side 123 (see Fig. 16) to swing the latter downward a short distance (see for comparison Figs. 16 and 17) and to finally release the cam 130 on the closing movement of the tucking arms 140, 141 to allow the clamping side 123 to swing outward back to its forward position by the action of its spring 127 (see Fig. 18).

When the machine is running and the former 80 is at rest (see Figs. 12 and 14) its sides 121 and 122 are slightly inclined to the vertical to permit the forward end 31 of the paper 35 to readily pass onto the top of the former and under the lip 128 and while the clamping side 123 is held in downward position by the action of the cam 131 on the cam 130. The former 80 next makes a complete revolution whereby the paper is wound around the former with the creases or scores 37 at the corners of the former and with the end portion 32 overlapping the front portion 31, as plainly shown in Fig. 12. When the former 80 comes to rest the crosshead 146 is on its down stroke with the tucking arms 140, 141 spread apart owing to the action of the spring 160 and the moving of the retaining heads 162 and 163 out of engagement with the cam 164. The lower ends of the tucking arms 140, 141 engage the free ends of the tongues 33 (see Fig. 16) and push the same downward and toward each other during the further downward movement of the crosshead 146 and the tucking arms 140, 141, it being understood that at this time the lug 201 has engaged the cam 130 and pressed the clamping side 123 downward. The retaining heads 162 and 163 now move in engagement with the arrow head 170 of the slide 171 so that the levers 142 and 143 are caused to swing to move the tucking arms 140, 141 still farther toward each other until they reach a vertical position, at which time the free ends of the tongues 33 are in register with the slits 34 and the lug 201 moves off the cam 130 to allow the clamping side 123 to swing upward by the action of its spring 127. By this movement, the tongues 33 and the lower ends of the tucking arms 140, 141 (see Fig. 18) are pushed through the slits 34 thus interlocking the end portions 31 and 32. The crosshead 146 now rises and with it the tucking arms 140, 141 to release the tongues 33 which by their own resiliency swing outward and assume an angular position relative to the end portion 31 thus firmly interlocking the portions 31 and 32. It is understood that when the crosshead 146 is on its down stroke, the presser foot 180 and its cross bar 186 engage the top of the upper portion 32 to hold the same in position during the tucking operation above described.

Immediately after the box has been formed and with the end portions 31 and 32 interlocked as described the box is pushed off the former 80, and for this purpose use is made of the former side 124, which acts as an ejector. The side 124 of the former 80 is mounted to slide transversely in bearings 210 formed on the sides 121 and 122, and the outer face of the side 124 is provided at its rear end with a lug 121 (see Fig. 11) adapted to engage the rear edge of the side of the box extending over the side 124. In order to impart a sliding movement to the side 124 while the former 80 is at rest, the following arrangement is made: The inner face of the side 124 is provided with an arm 212 attached to a shaft 213 mounted to slide in the hollow shaft 81 of the former 80, the forward end of the shaft 81 having a cut-out portion or a slot 214 for the passage of the arm 212 (see Figs. 11, 12, 14 and 15). When the former 80 is intermittently rotated, as previously explained, a similar rotation is given to the shaft 213, which latter is rigidly connected with the side 124. The rear end of the shaft 213 is provided with two stop collars 216 and 217 between which is held a shifting collar 218 through which extends loosely the shaft 213. The shifting collar 218 is provided at opposite sides with pins or trunnions 219 engaged by the forked and slotted end 220 of a lever 221 fulcrumed at 222 on the main frame 41. The lever 221 is pressed on at its upper portion by a spring 223, and the upper end of the lever 221 is provided with a friction roller 224 engaging the rear face of a cam 225 secured on the shaft 154. Immediately after the box is formed, as previously explained, the cam 225 imparts a swinging motion to the lever 221 whereby the shaft 213 is pushed forward to cause the lug 211 to push the box off the former 80 (see dotted lines in Fig. 3). As soon as this has been done the shaft 213 and with it the side 124 returns to normal position by the action of the spring 223 and the cam 225. The box pushed off the former 80 by the ejector side 124 passes between two jaws 230, 231 (see Figs. 23 and 24) forming part of a flattening device for flattening the four-sided box, with two sides alined, as plainly shown in Fig. 24. The jaw 230 is preferably stationary although it has a slight yielding movement, while the jaw 231 moves toward and from the jaw 230 to flatten the box 30 and incidentally to bend the tongues 33 farther outward against the under side of the end portion 31. The jaw 230 is pivoted at its lower end 232 on a bracket 233 attached to the main frame 41 (see Fig. 1).

The upper portion of the jaw 230 is provided at its outer face with a bracket 234 pivotally connected with the upper end of a rod 235 extending in a downwardly and in an inclined direction and slidingly engaging a bracket 236 attached to the main frame 41. A collar 237 is secured on the rod 235 and on this collar abuts a spring 238 resting on the bracket 236 thus yieldingly mounting the rod 235 to allow a slight yielding of the jaw 230. The swinging movement of the jaw 230 from the left to the right is limited by a stop collar 239 secured on the lower end of the rod and normally abutting against the bracket 236.

The movable jaw 231 is provided at the front with a stop plate 240 to limit the forward movement of the box when the latter is pushed between the jaws, as previously explained. The movable jaw 231 is hung on pairs of links 241, 242 pivotally connected with the jaw 230. Normally the jaws 230, 231 converge, as shown in Fig. 23, thus allowing the box 30 to pass between the jaws and with the lower corners resting on the opposite faces of the jaws to support the box 30 for the time being. The jaw 231 in closing swings toward the jaw 230 and likewise moves in an upward direction so as to flatten out the box 30, as indicated in Fig. 24. The movable jaw 231 is provided at its outer face with a bracket 245 connected by a link 246 with a pivot 247 held on the free end of an arm 248 of a bell crank lever 249 fulcrumed at 250 on a bracket 251 forming part of the main frame 41. The pivot 247 of the bell crank lever 249 is pivotally connected by a link 255 with a crank 256 secured on a transverse shaft 257 journaled in suitable bearings arranged on brackets 258 attached to the main frame 41. On the shaft 257 is mounted to rotate loosely a gear wheel 260 in mesh with a gear wheel 261 secured on a stud 262 journaled in suitable bearings on main frame brackets 263. The gear wheel 261 is in mesh with a gear wheel 264 mounted to rotate on a stud 265 held on a bracket 266 attached to the main frame 41. The gear wheel 264 is in mesh with the gear wheel 85, and when the main shaft 86 is rotated a rotary motion is transmitted by the gearing just described to the loose gear wheel 260, which latter is connected by a clutch mechanism 269 such as above described and shown in Figs. 5, 6, 7 and 8, with the shaft 257 to periodically rotate this shaft 257 in unison with the movement given to the former and its ejecting side 124 to close the jaw 231 immediately after the box 30 has been pushed into position between the jaws 230 and 231.

The clutch mechanism 269 mentioned is controlled by an arm 270 similar to the arm 102 and secured on the hub of the gear wheel 261. As the construction and action of this clutch mechanism 269 is exactly the same as the one previously described further description of the same is not deemed necessary, it being, however, understood that during the time the shaft 257 is turned a rocking motion is given to the bell crank lever 248 whereby the movable jaw 231 is first closed to flatten the box 30 and then opened to allow the flattened box to drop out from between the jaws 230 and 231 and to allow the next box formed to pass between the jaws. The jaw 231 remains stationary during the time the box is moved by the ejector side 124 from the former 80 between the jaws 230 and 231, and after the ejector side 124 has returned to its normal position the jaw 231 begins its next movement toward the jaw 230.

The flattened box 30 dropping out from between the open jaws 230, 231 is guided by a downwardly extending guide 271 into the right hand portion of a longitudinally extending trough 272 open at the top and at the ends and mounted on the base of the main frame 41. In the trough 272 is removably held a carton 273 (see Figs. 1 and 22) having the rear or left hand closing flaps 274 extended or open and the forward or right end closing flaps 275 at the bottom and the sides extended, while the top closing flap 276 is folded back, as plainly shown in Fig. 1. The bottom and side closing flaps 275 extend under tongues 277 attached at their right hand ends to the bottom and sides of the trough 272 at a point to the right of the guide 271 (see Fig. 22) so that the flat boxes can be readily pushed into the carton to fill the same, as hereinafter more fully described. The tongues 277 at the inner faces of the sides of the trough 272 are provided with converging retaining spring tongues 278 (see Fig. 22) to hold the last flat box 30 pushed into the carton in vertical position and against movement to the right. In this carton 273 is mounted to slide from the right to the left a resistance head 282 provided with a rod 283 mounted to slide at its left hand end in a bearing 284 attached to the projecting end 285 of the bottom of the trough 272. The rod 283 is engaged at the top by a friction bar 286 provided at its ends with slots 287 engaged by studs 288 arranged on the bearing 284. The bar 286 is pivotally connected with toggle levers 290 and 291, of which the toggle lever 291 is fulcrumed on the bearing 284, while the toggle lever 290 is pivotally connected with the bar 286. The pivot 292 connecting the toggle levers with each other is pressed on by a spring 293 attached to the bearing 284 so that the bar 286 bears on the rod 283 to offer resistance to the head 282 in its sliding movement from the right to the left as the flattened boxes accumulate in the carton 273.

The flattened box 30 after dropping into the trough 272 is pushed from the right to the left against the last one in the carton 273 by a plunger 300 intermittently reciprocating in the trough 272 at the tongues 278. For the purpose mentioned the plunger 300 is provided with a bar 301 mounted to slide between pairs of friction rollers 302 and 303, of which the friction rollers 302 are mounted on a bracket 304 while the friction rollers 303 are mounted on the bracket 251 previously mentioned. The plunger rod 301 is pivotally connected by a link 305 with the arm 306 of the bell crank lever 249 so that when the latter receives an intermittent rocking motion then a corresponding reciprocating movement is given to the plunger 300. Thus when the jaw 231 begins to move into closed position the plunger 300 is pushed from the right to the left to move the previously dropped flat box 30 in the same direction into the carton 273 and against the last one of the accumulated boxes in the carton (see Fig. 22). The plunger 300 moves back to its normal position of rest during the return or opening movement of the jaw 231 to allow the next box flattened between the jaws to eventually drop down into the trough 272 in front of the receding plunger 300. The top of the plunger 300 is preferably provided with an inclined guide 307 to direct a dropping flattened box into the trough 272 in front of the plunger.

A counter 310 of any approved construction is mounted on the main frame 41 and is provided with an actuating slide 311 (see Fig. 2) adapted to be engaged by an actuating member 312 attached to the plunger rod 301 so that on each reciprocating movement given to the plunger the counter is actuated to keep record of the number of flattened boxes in the carton 273. When the desired number of flattened boxes 30 have been pushed into the carton 273 then the machine is stopped either by hand, or by mechanical or electrical means of any approved construction. The filled carton is then removed from the trough 272 and an empty one is placed in its stead, after which the machine is again started.

In order to prevent the paper 35 from unrolling too fast on its roll, use is made of a flat brake band 320 held on an arm 321 fulcrumed at 322 on the bracket 233 previously mentioned. An upward swinging movement is given to the arm 321 by a spring 323 connected with the main frame 41. The brake band 320 presses with sufficient force against the roll of paper to prevent the latter from unrolling more of the paper 35 than called for by the rollers 50 and 51 at each full operation of the machine. The shaft 53 of the roller 51 (see Fig. 4) is preferably journaled in stationary bearings 330 while the shaft 52 of the roller 50 is preferably journaled in bearings 332 and 333 of which the bearing 332 is pressed downward by a rod 334 on which bears a spring 335, the tension of which can be adjusted by a nut 336 screwing on the rod 334. By the arrangement described the roller 50 bears with sufficient force on the paper 35 to insure a positive forward feeding of the paper when the rollers 50, 51 are rotated. The bearing 333 is preferably adjustable up or down by a screw 340 or other suitable means.

The operation is as follows:

About the time the crosshead 146 moves into uppermost position and with it the tucking levers 142, 143 and their tucking arms 140, 141, the rollers 50 and 51 begin to rotate while the former 80 is in the last portion of its period of rest so that the forward end 31 of the paper 35 is moved over the top of the former 80 and under the lip 128 and while the clamping side 123 is held in an inward position by the action of the cam 131 on the cam 130, as plainly shown in Fig. 14. The former 80 now begins to rotate and in doing so the cam 130 moves out of engagement with the cam 131 and the clamping side 123 clamps the forward edge of the paper against the under side of the lip 128 by the action of the spring 127. The paper 35 is now wound around the former 80 (see Figs. 15 and 12) and during this movement the crosshead 146 descends and with it the tucking levers 142, 143, their tucking arms 140, 141 and the knife 192, which cuts off the paper 35 at the end portion 32 at the time the forward feeding of the paper has ceased by the stopping of the rollers 50 and 51. The tucking arms 140, 141 are spread apart, as previously explained, during the downward movement so that the lower edge of the tucking arms 140, 141 engage the free ends of the tongues 33 and press the same toward each other and downward at the time the clamping side 123 is swung downward by the action of the lug 201 on the cam 130, as plainly shown in Fig. 17. The further closing of the tucking arms 140, 141 moves the tongues 33 into vertical position and in register with the slits 34 and at this time the clamping side 123 is released by the lug 201 moving out of engagement with the cam 130 and consequently the side 123 is swung upward by the action of its spring 127 to lift the front portion 31 of the paper and thus cause the tongues 33 to pass through the slits 34, the tongues being held in vertical position during this movement by the lower ends of the tucking arms 140, 141, as plainly shown in Fig. 18. When this has been done the crosshead 146 rises and with it the tucking levers 142, 143 and their arms 140, 141 to disengage the tucking arms from the portions 31 and 32 to allow the tongues 33 to swing into angular position by their own resiliency. As soon as the crosshead 146 has next moved upward sufficiently far for the lower ends of the tucking arms 140, 141 to clear the former 80 and the overlapping portions 31 and 32 of the box 30 and to lift the presser foot 180 out of engagement with the top portion 32 then the ejector side 124 is pushed forward by the action of the cam 225 on the roller 224 of the lever 221 connected with the shaft 213 connected with the ejector side 124. This movement of the ejector side 124 pushes the box 30 off the former 80 and between the jaws 230, 231, after which the ejector side 124 returns to its rearmost position by the action of the cam and lever mechanisms previously mentioned. It is understood that after the box is formed on the former 80 and immediately previous to the movable side 124 starting on its ejecting movement the cam 131 engages the cam 130 whereby the clamping side 123 is swung downward thus releasing the clamped forward end 31 of the strip of paper 35 at the lip 128, and allowing the ejecting lug 211 to easily push the finished box off the former 80. It is further understood that the cam 131 acting on the cam 130 holds the clamping side 123 open for the passage of the next forward end of the strip of paper (see Fig. 14) when the latter is fed forward by the rollers 50 and 51 on the next operation of the machine. The rollers 50 and 51 now again begin to feed the paper forward and the above described operation for forming the box on the former 80 is repeated. During the forming of the next box on the former 80, the previously ejected box now between the jaws 230 and 231 is flattened by the jaw 231 swinging from the right to the left and upward from the position shown in Fig. 23 to the position shown in Fig. 24. During this closing movement of the jaw 231 the previously flattened box is pushed into the carton 273 by the plunger 300, as previously explained, and when the jaw 231 swings back into open position and the plunger 300 recedes then the box flattened by the jaws 230, 231 drops down into the trough 272. Thus while one box is forming on the former 80 the previously made box is flattened between the jaws 230, 231 and the box made before this one is pushed by the plunger 300 into the carton 273. These operations are all done during one revolution of the main driving shaft 86.

Figure 20:
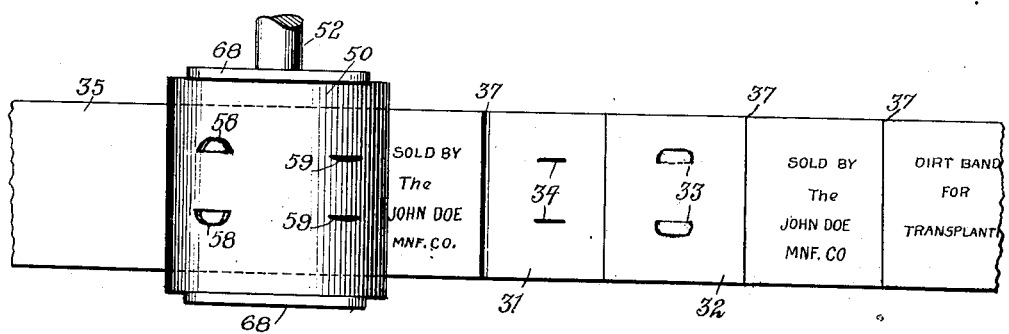
Fig. 20 is a plan view of the same.
Figure 21:
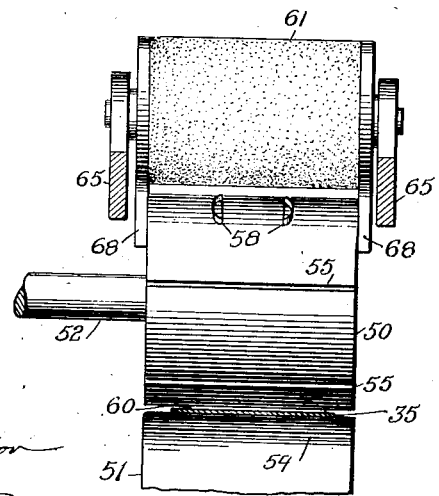
Fig. 21 is a cross section of the same.

It will be noticed that the rollers 50 and 51 not only feed the paper 35 forward but provide the same with transverse scores 37, with transverse tongues 33 and longitudinal slits 34, as plainly shown in Fig. 20, and, in addition, desired legends are printed on the boxes between adjacent scores 37.

It will further be noticed that the paper is cut by the knife 192 intermediate adjacent tongues 33 and slits 34 so that each cut-off piece of paper is provided at the forward end 31 with slits 34 and at the rear end 32 with tongues 33 interlocked with the slits 34 by the action of the tucking arms 140, 141 and the spring-pressed clamping side 123 of the former 80.

It will further be noticed that when the box 30 is flattened by the jaws 230, 231 then the tongues 33 are flattened out against the inner face of the end portion 31 of the box to securely fasten the overlapping end portions 31 and 32 together.

The arms 246, 248 and 305, 306 are so arranged that the jaws 230 and 231 and the plunger 300 exert a maximum pressure with the least power during the period of their final forward movement. It is understood that the arms during this movement straighten out and move slowly thus exerting maximum pressure.

From the foregoing it will be seen that the machine is entirely automatic in operation and can be run at a high rate of speed, say from 75 to 100 revolutions per minute, thus turning out a large quantity of boxes in a comparatively short time.

Although the machine as shown and described has been satisfactorily tested in every detail, I do not limit myself to the detail construction disclosed as the same may be varied without deviating from the spirit of my invention.

I do not limit myself to the exact timing given nor to the detailed construction disclosed relative to the clutch mechanisms as a clutch embodying the principles of my invention—

1. May make one or any number of revolutions and rest one or any number of revolutions, 2. May make any part of a revolution and rest any part of a revolution, 3. The time at which motion starts or stops can be varied automatically or manually and while the machine is running, 4. There may be any combination of 1, 2 and 3.

This can be done—

1. By varying the ratio of the gear wheels 83, 85 and the pinion 82.

2. By increasing the length of the cam 101 so that it will retain contact longer with the arm 100, 3. By increasing the number of cam arms 102 with the cams 101 together with the necessary operating means, 4. By a more complicated arrangement of moving swinging cam arms 102 with the cams 101 and the necessary operating means actuated by other clutches or means, 5. By combining any or all of 1, 2, 3 and 4.

I do not limit myself to a timing clutch, as a clutch embodying the principles of my invention may be used to throw machinery into and out of gear manually by using a cam arm 102 pivoted to the main frame and actuated by a hand lever.

Having thus described my invention, I claim as new and desire to secure by Letters Patent:

1. In a machine for making paper boxes, a feeding, scoring and lock forming means feeding a strip of paper forward, scoring it transversely and providing it with locking means, forming means receiving the strip of paper from the said feeding, scoring and lock forming means and forming the strip into box shape along the creases at the corners, and interlocking means coacting with the said forming means and engaging the locking means with each other.

2. In a machine for making paper boxes, a feeding, scoring and lock forming means feeding a strip of paper forward, scoring it transversely and providing it with locking means, forming means receiving the strip of paper from the said feeding, scoring and lock forming means and forming the strip into box shape along the creases at the corners, interlocking means coacting with the said forming means and engaging the locking means with each other, and ejecting means coacting with the said forming means and removing the formed box from the forming means.

3. In a machine for making paper boxes from an endless web or strip of paper, an intermittently rotating forming device, an intermittently rotating feeding, scoring and lock forming device feeding the strip of paper in the length required for one box to the said forming device, scoring the strip of paper transversely and providing it with locking members, a tucking device coacting with the said forming device and interlocking the said locking members, a main shaft, and connecting means connecting the said main shaft with the said devices to actuate the same in the proper sequence.

4. In a machine for making paper boxes from an endless web or strip of paper, an intermittently rotating forming device, an intermittently rotating feeding, scoring and lock forming device feeding the strip of paper in the length required for one box to the said forming device, scoring the said strip of paper transversely and providing it with locking members, a tucking device coacting with the said forming device and interlocking the said locking members, a cutting device coacting with the said tucking device to cut off a length of the strip of paper fed forward by the said feeding, scoring and lock forming device at each action thereof, a main shaft, and connecting means connecting the said main shaft with the said devices to actuate the same in the proper sequence.

5. In a machine for making paper boxes from an endless web or strip of paper, an intermittently rotating forming device, an intermittently rotating feeding, scoring and lock forming device feeding the strip of paper in the length required for one box to the said forming device, scoring the strip of paper transversely and providing it with locking members, a tucking device coacting with the said forming device and interlocking the said locking members, a cutting device coacting with the said tucking device to cut off a length of the strip of paper fed forward by the said feeding, scoring and lock forming device at each action thereof, an ejecting device coacting with the said forming device and removing the finished box from the forming device, a main shaft, and connecting means connecting the said main shaft with the said devices to actuate the same in the proper sequence.

6. In a machine for making paper boxes from an endless web or strip of paper, an intermittently rotating forming device, an intermittently rotating feeding, scoring and lock forming device scoring the strip of paper transversely and providing it with locking members, a tucking device coacting with the said forming device and interlocking the said locking members, a cutting device coacting with the said tucking device to cut off a length of the strip of paper fed forward by the said feeding, scoring and lock forming device at each action thereof, an ejecting device coacting with the said forming device and removing the finished box from the forming device, a flattening device receiving the box from the said forming device by the action of the said ejecting device, the said flattening device pressing the box into flat shape with two adjacent sides alined, a main shaft, and connecting means connecting the said main shaft with the said devices to actuate the same in the proper sequence.

7. In a machine for making paper boxes from a strip of paper, a pair of coacting intermittently rotating rollers between which passes the strip of paper and of which one is provided at its peripheral face with longitudinally extending scoring ridges and the other is provided with corresponding scoring grooves, the said scoring ridges dividing the peripheral face of its roller into a number of approximately equal length portions and into a double length portion which is approximately double in length to that of one of the said single equal portions and the said grooves dividing the peripheral face of its roller into a number of approximately equal length portions and into a double length portion which is approximately double in length to that of one of the said single equal portions, slitting knives, and tongue forming knives attached to one of the rollers and projecting beyond the peripheral face thereof, the slitting knives and the tongue forming knives being spaced apart and located in the said double length portion between the corresponding adjacent scoring members.

8. In a machine for making paper boxes from a strip of paper provided at one end with slits and at the other end with tongues adapted to engage the said slits, an intermittently rotating former having four sides of which one is spring-pressed and pivoted, the side adjacent the free end of the said pivoted side being provided with a lip against which the forward end of the paper is clamped by the free end of the said pivoted side, a cam fixed on the said clamping side, and a movable cam engaging the said fixed cam to hold the clamping side open for the forward end of the paper to engage the said lip, the fixed cam moving out of engagement with the said movable cam on rotating the former to allow the clamping side to clamp the forward end of the paper against the lip to wind the paper around the former on rotating the former and to overlap the ends of the paper at the clamping side and with the tongues and slits in register with each other.

9. In a machine for making paper boxes from a strip of paper provided at one end with slits and at the other end with tongues adapted to engage the said slits, a former on which the said strip is wound with the ends of the strip of paper overlapping and the tongues in register with the slits and with the end of the paper having the tongues uppermost, a pair of tucking arms adapted to engage the said tongues, means imparting reciprocating movement to the said tucking arms to engage the latter with the tongues, and means moving the arms toward each other to move the tongues into angular position and into register with the said slits.

10. In a machine for making paper boxes from a strip of paper provided at one end with slits and at the other end with tongues adapted to engage the said slits, a former on which the said strip is wound with the ends of the strip of paper overlapping and the tongues in register with the slits, and with the end of the paper having the tongues uppermost, the former having a movable member on which rests the end of the paper having the slits, a pair of tucking arms adapted to engage the said tongues, means imparting a reciprocating movement to the said tucking arms to engage the latter with the tongues, means to move the tucking arms toward each other to move the tongues into angular position relative to the said slits, and means imparting movement to the said movable member to raise the end of the paper having the slits to pass the tongues through the slits.

11. In a machine for making paper boxes from a strip of paper provided at one end with slits and at the other end with tongues adapted to engage the said slits, a former on which the said strip is wound with the ends of the strip of paper overlapping and the tongues in register with the slits and with the end of the paper having tongues uppermost, the former having a movable member on which rests the end of the paper having the slits, a pair of tucking arms adapted to engage the said tongues, means imparting reciprocating movement to the said tucking arms to engage the latter with the tongues, means to move the tucking arms toward each other to move the tongues into angular position relative to the said slits, a spring pressing the movable member upward, and means coacting with the said tucking arms to move the said movable member of the former downward at the time the tongues are moved into angular position and in registering position with the slits, the said means on releasing the said movable member allowing the latter to return by the action of its spring to engage the tongues with the slits.

12. In a machine for making paper boxes from a strip of paper provided at one end with slits and at the other end with tongues, a former around which the strip of paper is wound with the ends overlapping and the end having the tongues uppermost, a pair of tucking levers provided with tucking arms adapted to engage the said tongues to move the latter into angular position and in register with the said slits, a reciprocating crosshead on which the said levers are fulcrumed to swing the tucking arms toward and from each other, a spring pressing the levers to normally hold the tucking arms apart, heads on the said levers, a fixed cam adapted to be engaged by the said heads, and a slide having an up and down sliding movement and adapted to be engaged by the said lever heads.

13. In a machine for making paper boxes from a strip of paper provided at one end with slits and at the other end with tongues, a former around which the strip of paper is wound with the ends overlapping and the end having the tongues uppermost, a pair of tucking levers provided with tucking arms adapted to engage the said tongues to move the latter into angular position and in register with the said slits, a reciprocating crosshead on which the said levers are fulcrumed to swing the tucking arms toward and from each other, a spring pressing the levers to normally hold the tucking arms apart, heads on the said levers, a fixed cam adapted to be engaged by the said heads, a slide having an up and down sliding movement and adapted to be engaged by the said lever heads, a movable spring pressed member on the said former and provided with a cam, and an arm on one of the said levers and engaging the said cam to impart motion to the said movable member against the tension of the spring of the movable member, the said arm releasing the cam on the tucking arms moving toward each other and at the time of moving into lowermost position.

14. In a machine for making paper boxes, a reciprocating crosshead, a pair of spring-pressed tucking levers fulcrumed on the said crosshead and provided with heads, a fixed spreading cam adapted to be engaged by the said lever heads, and a slide mounted to slide between the lever heads and provided with an arrow-shaped head adapted to be engaged by the said lever heads.

15. In a machine for making paper boxes from a strip of paper provided at one end with slits and at the other end with tongues adapted to engage the said slits, an intermittently rotating former having four sides of which one is spring-pressed and pivoted, the side adjacent the free end of the said pivoted side being provided with a lip against which the forward end of the paper is clamped by the free end of the said pivoted side, a cam fixed on the sail clamping side, a movable cam engaging the said fixed cam to hold the clamping side open for the forward end of the paper to engage the said lip, the fixed cam moving out of engagement with the said movable cam on rotating the former to allow the clamping side to clamp the forward end of the paper against the lip to wind the paper around the former on rotating the former and to overlap the ends of the paper at the clamping side and with the tongues and slits in register with each other, and a presser foot moving with the said tucker arms and adapted to engage the uppermost overlapping end at the time the tucking arms engage the tongues.

16. In a machine for making paper boxes from a strip of paper, an intermittently revolving former of polygonal shape and around which the strip of paper is wound to form a box, the said former having one of its sides mounted to slide lengthwise of the axis of the former, the said slidable side having an ejecting lug adapted to engage one edge of the strip of paper, and means imparting a sliding motion to the said slidable side to cause the ejecting lug to push the box off the former.

17. In a machine for making paper boxes from a strip of paper, an intermittently revolving former of polygonal shape and around which the strip of paper is wound to form a box, the said former having one of its sides mounted to slide lengthwise of the axis of the former, the said slidable side having an ejecting lug adapted to engage one edge of the strip of paper, the said former having a hollow shaft provided with a cut-out portion, a second shaft mounted to slide in the said hollow shaft and having an arm extending through the cut-out portion and connected with the said slidable former side, and means imparting an intermittent sliding motion to the said second shaft and the said slidable side attached thereto to cause the ejecting lug to push the box off the former.

18. In a machine for making paper boxes from a strip of paper, the combination of a pair of intermittently rotating feed rollers for feeding a strip of paper forward, an intermittently rotating former having four sides, and clamping means formed by adjacent sides for clamping the forward end of the strip of paper in position on the former to wind up the strip of paper around the former on rotating the latter and while the feed rollers feed the strip of paper forward until the ends of the paper overlap on the former, interlocking means coacting with the said former at the time the latter is at rest to fasten the overlapping ends of the strip of paper together to form a box, and ejecting means having an ejecting member which forms another side of the former.

19. In a machine for making paper boxes, a four sided former, of which one side is pivoted and provided with slots, a cam on the said pivoted side, a spring pressing the said pivoted side outward, a pair of reciprocating tucking arms adapted to swing toward and from each other and to pass through the said slots, and a cam arm moving in unison with one of the tucking arms and adapted to engage the said cam on the pivoted side to swing the latter inward and to then release the same to allow the pivoted side to return by the action of its spring.

20. In a machine for making paper boxes, a flattening device for flattening a square box, comprising two jaws adapted to receive the box between them, the jaws when open converging in an upward direction, links pivotally connecting the jaws with each other, and means imparting movement to one of the jaws to move the latter toward the other jaw and in an upward direction to flatten the box between the closing jaws.

21. In a machine for making paper boxes from a strip of paper, a pair of intermittently rotating feed rollers between which passes the strip of paper, the feed rollers being provided on their peripheral faces with scoring means and one of the rollers being provided with slit and tongue forming knives, the shafts of the feed rollers being geared together, a former mounted to rotate intermittently and in unison with the feed rollers and receiving the paper from the feed rollers and winding it around to form a box with the ends of the paper overlapping, a reciprocating tucking device coacting with the said former to fasten the overlapping ends of the paper together, a main shaft, a driving connection between the said main shaft and the said reciprocating tucking device, a driving connection between the said main shaft and the said former and including a periodically actuated clutch, and a driving connection between the said main shaft and one of the speed roller shafts and including a periodically actuated clutch.

22. In a machine for making paper boxes, a flattening device comprising two jaws adapted to receive and support the boxes between them when open, links pivotally connecting the jaws with each other and means for imparting movement to one of the jaws to move it toward the other jaw and engage and flatten the box between the jaws.

23. In a machine for making paper boxes, a flattening device comprising two jaws adapted to receive and support the box between them when open, links pivotally connecting the jaws with each other, means for moving one of the jaws toward the other jaw and in an upward direction to flatten the box between the jaws.

24. In a machine for making paper boxes, a flattening device comprising two jaws adapted to receive and support the box between them when open, said jaws converging from their upper toward their lower ends, a pair of links connecting one jaw with the other jaw, and means for imparting relative movement to said jaws to flatten the box between them.

25. In a machine for making paper boxes, a yieldingly supported, normally stationary jaw, a movable jaw, links connecting it with said yieldingly supported jaw, said links normally holding said movable jaw in position to allow the insertion of the box to be flattened between said jaws, and means for operating said movable jaw.

26. In a machine for making paper boxes, a flattening device comprising a normally stationary jaw, a movable jaw spaced from said stationary jaw to receive the box to be flattened between them, guiding means for said movable jaw and means for swinging it toward said normally stationary jaw to flatten the box placed between them.

27. In a machine for making paper boxes, a revolving former whereon the strip of paper to form the box is wound, means for securing the ends of the strip together, and means for ejecting the completed box at one end of the former, said ejecting means comprising a movable wall of the former.

28. In a machine for making paper boxes open at each end, a revolving former having means for gripping one end of the strip from which the box is to be formed, means for severing the strip when it has been wrapped around the former by the revolution thereof, means for securing the lapping ends of the strip together, and means for ejecting the completed strip from the former.

29. In a machine for making paper boxes from a strip of paper, a revolving former having a hinged longitudinal member for gripping the end of the strip of paper to wrap the paper around the former when it is revolved, means for severing the strip of paper at the end of the wrapping operation, means for securing the lapping ends of the paper together, and means for ejecting the completed box from the former.

30. In a machine for making paper boxes from a strip of paper, a revolving former, rectangular in cross section, and having means for holding the end of the strip of paper fed thereto, the revolution of the former wrapping the strip of paper around it, means for severing the strip of paper at the end of the wrapping operation, means for fastening the lapping ends of the strip together, and means for ejecting the completed box from the former.

31. A machine for making paper boxes from a strip of paper, a revolving former having four sides, means for gripping one end of a strip of paper fed to said former, the revolution of the former wrapping said strip around it, means for severing the strip of paper, means for securing the lapping ends of the strip together, and means for ejecting the strip from the former.

32. In a machine for making paper boxes from a strip of paper, a revolving former having means for gripping one end of the strip of paper to wrap the paper around the former as it is revolved, means for severing the strip of paper and securing its lapping ends together, said former having a movable wall operating as an ejector to discharge the completed boxes from the former.

33. In a machine for making paper boxes from a strip of paper, a revolving former having means for grasping one end of the strip of paper fed thereto, the revolution of the former wrapping the paper thereon, means for severing the strip of paper, means for fastening the lapping ends of the strip of paper together, said former having a longitudinally sliding wall operating as an ejector to discharge the completed box from the former.

34. In a machine for making paper boxes, a revolving former having means for gripping the end of a strip of paper fed thereto, the revolution of the former winding the paper thereon to form the walls of the box, means for severing the strip of paper at the completion of the winding operation, and means for forming slots and tongues in the lapped ends of the box and interlocking one with the other, and means for ejecting the box from the former.

35. In a machine for making paper boxes from a strip of paper, provided at one end with slits and at the other end with tongues adapted to engage the said slits, a former on which the said strip is wound with the ends overlapping the tongues in register with said slits, means co-acting with said former to direct the tongues through said slits for locking the ends of the strips together to complete the box.

36. In a machine for making paper boxes from a strip of paper, provided at one end with slits and at the other end with tongues adapted to engage the said slits, a former on which the said strip is wound with the ends overlapping the tongues in register with said slits, means co-acting with said former to direct the tongues through said slits for locking the ends of the strips together to complete the box, and means for ejecting the completed box from the former.

37. In a machine for making paper boxes from a strip of paper, provided at one end with slits and at the other end with tongues adapted to engage the said slits, a former on which the said strip is wound with the ends overlapping the tongues in register with said slits, means co-acting with said former to direct the tongues through said slits for locking the ends of the strips together to complete the box, and means for ejecting the completed box from the former, said ejecting means being mounted in the wall of the former and having a movement lengthwise thereof.

38. In a machine for making paper boxes from a strip of paper transversely scored and provided at its ends with a locking means, a former provided with means for gripping one end of the strip and having a rotating movement to wind the strip thereon, means for releasing said gripping means at a predetermined point in the rotation of the former and means for guiding said locking means into interlocking engagement with each other.

39. In a machine for making paper boxes from a strip of paper, transversely scored and provided at its ends with a locking means, a former provided with means for gripping one end of the strip and having a rotating movement to wind the strip thereon, means for releasing said gripping means at a predetermined point in the rotation of the former and means for guiding said locking means into interlocking engagement with each other, and means for ejecting the completed box from said former.

40. In a machine for making paper boxes from a strip of paper, transversely scored and provided at its ends with a locking means, a former provided with means for gripping one end of said strip and having a rotating movement to wind the strip thereon, means for releasing said gripping means at a predetermined point in the rotation of the former, means for guiding said locking means into interlocking engagement with each other, and means for ejecting the completed box from said former, said ejecting means comprising a slidable portion of the wall of said former.

ARTHUR W. HARRIS.